United States Patent
Zuardy et al.

(10) Patent No.: US 9,834,298 B2
(45) Date of Patent: Dec. 5, 2017

(54) PRESSURE FUSELAGE OF AN AIRCRAFT WITH A FUSELAGE SHELL AND A PRESSURE BULKHEAD DISPOSED THEREIN

(71) Applicant: Airbus Operations GmbH, Hamburg (DE)

(72) Inventors: M. Ichwan Zuardy, Hamburg (DE); Karim Grase, Hamburg (DE); Carsten Rowedder, Himmelpforten (DE); Claas De Jong, Hamburg (DE); Markus Mueller, Hamburg (DE); Mathias Jessrang, Hamburg (DE)

(73) Assignee: Airbus Operations GmbH (DE)

( * ) Notice: Subject to any disclaimer, the term of this patent is extended or adjusted under 35 U.S.C. 154(b) by 615 days.

(21) Appl. No.: 14/491,251

(22) Filed: Sep. 19, 2014

(65) Prior Publication Data
US 2015/0008285 A1 Jan. 8, 2015

Related U.S. Application Data

(63) Continuation of application No. PCT/EP2013/055501, filed on Mar. 18, 2013.

(60) Provisional application No. 61/613,061, filed on Mar. 20, 2012.

(30) Foreign Application Priority Data

Mar. 20, 2012 (DE) .................. 10 2012 005 451

(51) Int. Cl.
*B64C 1/10* (2006.01)

(52) U.S. Cl.
CPC .................... *B64C 1/10* (2013.01)

(58) Field of Classification Search
CPC .............. B64C 1/10; B64D 11/0023
See application file for complete search history.

(56) References Cited

U.S. PATENT DOCUMENTS

| | | | |
|---|---|---|---|
| 4,728,059 A | 3/1988 | Stephen et al. | |
| 6,276,866 B1 * | 8/2001 | Rutan | B29C 65/562 244/119 |
| 6,378,805 B1 * | 4/2002 | Stephan | B64C 1/10 244/117 R |

(Continued)

FOREIGN PATENT DOCUMENTS

| | | |
|---|---|---|
| DE | 10 2006 029 231 A1 | 1/2008 |
| DE | 10 2007 044 388 B4 | 8/2012 |

(Continued)

OTHER PUBLICATIONS

Search Report DE 10 2012 005 451.3 (Dec. 13, 2012).
Int'l Search Report and Written Opinion PCT/EP2013/055501 (Jun. 12, 2013).

*Primary Examiner* — Nicholas McFall
(74) *Attorney, Agent, or Firm* — Lerner, David, Littenberg, Krumholz & Mentlik, LLP

(57) ABSTRACT

A pressure bulkhead of an aircraft with a fuselage shell and a pressure bulkhead disposed therein preferably in the rear region for forming a fuselage-internal pressure region, which pressure bulkhead is attached on the edge in the interior of the fuselage shell, wherein the pressure bulkhead has a lenticular cross-section and a sandwich construction that comprises a foam core sandwiched between two opposing exterior shells.

10 Claims, 2 Drawing Sheets

(56) References Cited

U.S. PATENT DOCUMENTS

| | | |
|---|---|---|
| 8,033,503 B2 | 10/2011 | Basso |
| 8,444,089 B2 | 5/2013 | Mischereit et al. |
| 2008/0179459 A1* | 7/2008 | Garcia Laja .............. B64C 1/10 244/119 |
| 2009/0152400 A1* | 6/2009 | Verde Preckler ......... B64C 1/40 244/133 |
| 2010/0155533 A1 | 6/2010 | McKinnie et al. |
| 2010/0230539 A1* | 9/2010 | Mischereit ................ B64C 1/10 244/119 |
| 2010/0285673 A1 | 11/2010 | Orlando |
| 2011/0233334 A1 | 9/2011 | Stephan |

FOREIGN PATENT DOCUMENTS

| | | |
|---|---|---|
| EP | 0 217 117 A1 | 4/1987 |
| GB | 478 307 A | 1/1938 |
| JP | H11 20694 A | 1/1999 |
| WO | 99/24316 A1 | 5/1999 |
| WO | 2009/037008 A1 | 3/2009 |

* cited by examiner

PRESSURE FUSELAGE OF AN AIRCRAFT WITH A FUSELAGE SHELL AND A PRESSURE BULKHEAD DISPOSED THEREIN

CROSS-REFERENCE TO RELATED APPLICATIONS

The present application is a continuation of International Application No. PCT/EP2013/055501, filed Mar. 18, 2013, which claims priority from German Patent Application No. 10 2012 005 451.3 filed Mar. 20, 2012 and from U.S. Provisional Patent Application No. 61/613,061 filed Mar. 20, 2012, the disclosure of which applications is hereby incorporated herein by reference.

FIELD OF THE INVENTION

The technical field relates to a pressure bulkhead of an aircraft, in particular of an airplane, with a fuselage shell and a pressure bulkhead, preferably arranged in the rear region of the aforesaid, for forming a fuselage-internal pressure region that is attached on the edge in the interior of the fuselage shell.

BACKGROUND OF THE INVENTION

In airplanes, in particular in commercial aircraft, it is necessary to maintain an air pressure in the cabin space, which air pressure corresponds to the normal pressure. This means that in such aircraft in flight there is a pressure differential between the interior pressure region and the exterior region as well as certain partitioned-off regions of the airplane. In order to maintain this pressure differential it is necessary to design the fuselage accordingly and to partition off in a pressure-proof manner, by means of pressure walls, any fuselage regions that are not required as cabin space.

In the case of passenger aircraft it is thus common practice to finish off the rear of the cabin space with a pressure bulkhead, also referred to as a "rear shell". Despite a relatively modest overpressure of approximately 0.6 bar, in flight this pressure bulkhead is subjected to relatively large loads depending on the area. Consequently, in particular in wide-bodied aircraft, very large forces can occur on the pressure bulkhead. These forces are usually taken up by the fuselage structure of the aircraft.

EP 0 217 117 A1 shows a pressure bulkhead of an aircraft, wherein in the rear region a pressure bulkhead is arranged so as to form a fuselage-internal pressure region. The pressure bulkhead has the shape of a spherical cap, from which a holding device follows on the negative-pressure side, which faces away from the cabin region. The holding device comprises a close-meshed net of interwoven belts, which net is attached to fuselage frames of the fuselage shell and has been tensioned so as to rest against the pressure bulkhead. The belts comprise plastic fibers that hold the pressure bulkhead at the rear by way of elastic spacers that are evenly distributed over the area of the pressure bulkhead. This holding device supports the pressure bulkhead as a safety device.

DE 10 2006 029 231 A1 shows a rear pressure bulkhead to form a fuselage-internal pressure region, which pressure bulkhead in the unloaded state is almost flat. As a result of this, better use can be made of the cabin space. The flat pressure bulkhead has a circular or oval design and essentially comprises a bulkhead main section surrounded by a frame. The bulkhead main section is a net-like component comprising lattice-type webbing with a circumferential edge. The frame carries this main bulkhead section and comprises a light-metal hollow profile. The web of the bulkhead main section is attached to the frame, which is riveted to the fuselage shell. A thermoplastic membrane rests in a sheet-like manner on the web of the bulkhead main section as a sealing element in order to achieve an airtight design of the planar pressure bulkhead.

BRIEF SUMMARY OF THE INVENTION

An aspect of the present invention relates to a pressure bulkhead for the pressure fuselage of an aircraft, which pressure bulkhead is simple to manufacture and can be integrated in a space-saving manner in the pressure fuselage.

The invention encompasses the technical teaching according to which the pressure bulkhead has a lenticular cross-section and has a sandwich construction that comprises a foam core sandwiched between two opposing shells.

The solution according to an aspect of the invention provides an advantage, in particular, in that the special pressure bulkhead thanks to its essentially flat (planar) design can be integrated in a space-saving manner in the pressure fuselage of an aircraft. In the context of this invention the term "lenticular" or "lenticular shape" refers to a cross-section that on both sides has outwardly-curved sides; however, it is also possible to design one of the two sides so that it is planar. Due to the lenticular sandwich construction the pressure bulkhead according to an embodiment of the invention is characterized by very harmonic and uniform deformation or load, and, when compared to the state of the art, by improved impact resistance. The lenticular cross-section is selected in such a manner that adaptation to the particular load level takes place by way of the cross-section. During impact load the lenticular sandwich design deforms almost comprehensively because the impact energy is very largely converted to bending deformation energy and to a lesser extent to crushing deformation energy of the form core. Consequently the damage resistance and thus the damage tolerance ability are improved. The sandwich construction comprising the two exterior shells and the foam core can be produced more efficiently by means of automatic production equipment, which results in an improvement in the production quality and in the production time.

Preferably, each exterior shell of the pressure bulkhead comprises a curved cross-section formed in accordance with a parabolic function, especially a suspension-cable curve. The exterior shells curved in this manner give the pressure bulkhead its lenticular cross-section and act as a main-bearing structure in the respective load directions. As a result of this specially-curved cross-section the exterior shell can withstand high loads in the respective direction of load. The exterior shells of the pressure bulkhead preferably comprise a fiber-reinforced plastic material, in particular a carbon-fiber-reinforced plastic (CFP).

In contrast to this the foam core of the pressure bulkhead preferably comprises a polymethacrylimide material; it ensures distribution of the load and establishes the connection to the opposing exterior shell. It is imaginable to embed additional reinforcements or crack arresting devices in the foam core in order to further increase the damage tolerance ability. Furthermore, lines and other system elements can also be integrated in the foam core. Thanks to the foam core the pressure bulkhead provides excellent sound insulation and thermal insulation, thus improving passenger comfort.

In addition to, or instead of, a foam core, the exterior shells can also enclose a core that at least in some sections is solid, a wood core or a honeycomb core. This makes possible a variable design of the structural element in order to expand its field of application.

According to a further aspect of the invention, it is proposed that the pressure bulkhead according to an embodiment of the invention is attached, by way of pivoting bearing means, in the interior to the fuselage shell. In this arrangement the pivoting bearing means can be designed according to several preferred embodiments described below.

In a first embodiment it is proposed that the pivoting bearing means are designed as at least one pair of opposing hinge elements which on the one hand are attached to the edge of the respectively associated exterior shell of the pressure bulkhead, and on the other hand to the fuselage structure. In this arrangement, attaching the hinge elements can take place by way of multi-row, preferably triple-row, riveting to the pressure bulkhead and to the fuselage structure. (Bending) loads that occur during loading of the pressure bulkhead towards the fuselage structure are taken up by the pivoting bearing means so that the pressure bulkhead is securely connected to the fuselage structure even in the case of high loading (deformation).

According to a second preferred embodiment it is preferred that the pivoting bearing means comprise a bearing-pin ring that extends in the radial direction away from the edge of the pressure bulkhead, which bearing-pin ring interacts with a bearing-seat ring attached to the fuselage structure. In this arrangement the bearing-seat ring can preferably comprise two ring halves that partially enclose the bearing-pin ring. Consequently these pivoting bearing means can be installed in a simple manner. In this arrangement, too, the fuselage connection can be implemented by riveting.

According to a third preferred embodiment it is proposed that the pivoting bearing means comprise at least one first bearing block, which in the edge region of one exterior shell is attached so as to radially project from said exterior shell, which first bearing block interacts, by way of a bearing pin, with a second bearing block, designed so as to correspond to the aforesaid, which second bearing block is attached to the fuselage structure. Preferably, several such pivoting bearing means are arranged, so as to be equidistantly spaced from each other, along the circumference of the pressure bulkhead in order to make possible a safe pivoting connection of the pressure bulkhead to the fuselage structure. Here again, the fuselage connection can be implemented by riveting.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
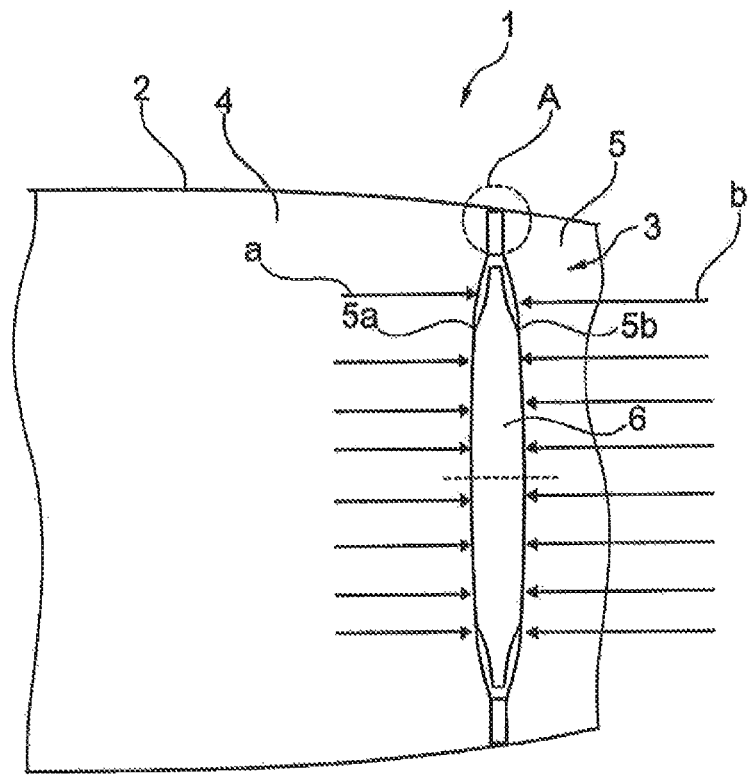
FIG. 1 a partial cross-section of the pressure bulkhead of an aircraft in the region of a pressure bulkhead integrated at the rear of the aforesaid, FIG. 2 a perspective view of pivoting bearing means for the pivoting connection of the pressure bulkhead to the fuselage structure according to a first embodiment, FIG. 3 a perspective view of pivoting bearing means for the pivoting connection of the pressure bulkhead to the fuselage structure according to a second embodiment, and FIG. 4 a perspective view of pivoting bearing means for the pivoting connection of the pressure bulkhead to the fuselage structure according to a third embodiment.

According to FIG. 1 the fuselage shell 2, which in the diagram is shown in sections in the rear region 1 only, of the pressure bulkhead of a commercial aircraft comprises a pressure bulkhead 3 to form a fuselage-internal pressure region 4. In the pressure region 4 there is cabin pressure, whereas in an exterior region 5 separated by the pressure bulkhead 3 there is ambient pressure. The cabin pressure acting on the pressure bulkhead 3 is indicated by a row of arrows a; the exterior pressure acting on the pressure bulkhead 3 on the opposite side is illustrated by a row of arrows b.

The pressure bulkhead 3 comprises a lenticular cross-section and is built in a sandwich construction. According to the sandwich construction two opposing curved exterior shells 5a and 5b enclose a foam core 6. While the two exterior shells 5a and 5b of the pressure bulkhead 3 comprise a carbon-fiber-reinforced plastic material, the foam core 6 that is enclosed by the aforesaid comprises a polymethacrylimide material.

At the edge the lenticular pressure bulkhead 3 is pivotally attached in the interior to the fuselage shell 2 by way of pivoting bearing means arranged in the region A in order to take up any deformation triggered by a pressure differential in relation to both sides of the pressure bulkhead 3.

Figure 2:
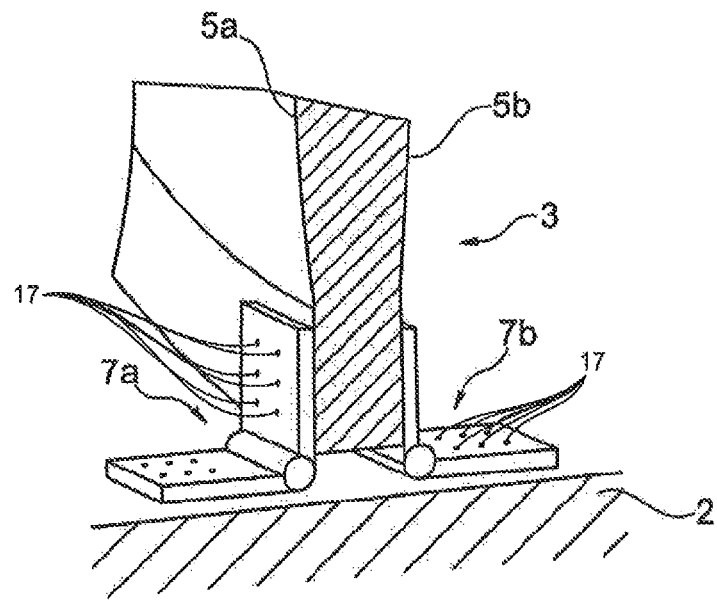

According to FIG. 2, the pivoting bearing means according to a first embodiment can comprise a pair of opposing hinge elements 7a and 7b that are attached on the one hand to the edge of the respectively associated exterior shell 5a or 5b of the pressure bulkhead 3 and on the other hand to the fuselage structure 2 (in the figure only diagrammatically indicated). In this arrangement, the hinge elements 7a and 7b can be attached, by way of multi-row riveting 17, to the pressure bulkhead 3 and to the fuselage structure 2.

Figure 3:
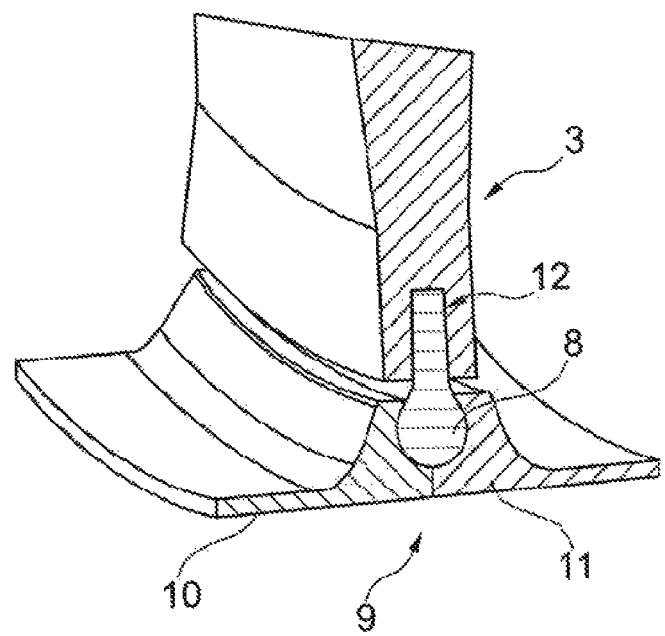

According to the second embodiment, shown in FIG. 3, the pivoting bearing means comprise a bearing-pin ring 8 that extends in the radial direction away from the edge of the pressure bulkhead 3, which bearing-pin ring 8 interacts in a positive-locking manner with a bearing-seat ring 9. The bearing-pin ring 8, which comprises metal, is attached in a circumferential groove 12 of the pressure bulkhead 3. The bearing-seat ring 9 comprises two ring halves 10 and 11 which partly enclose the bearing-pin ring 8 in the pin region so as to provide the desired pivoting function.

Figure 4:
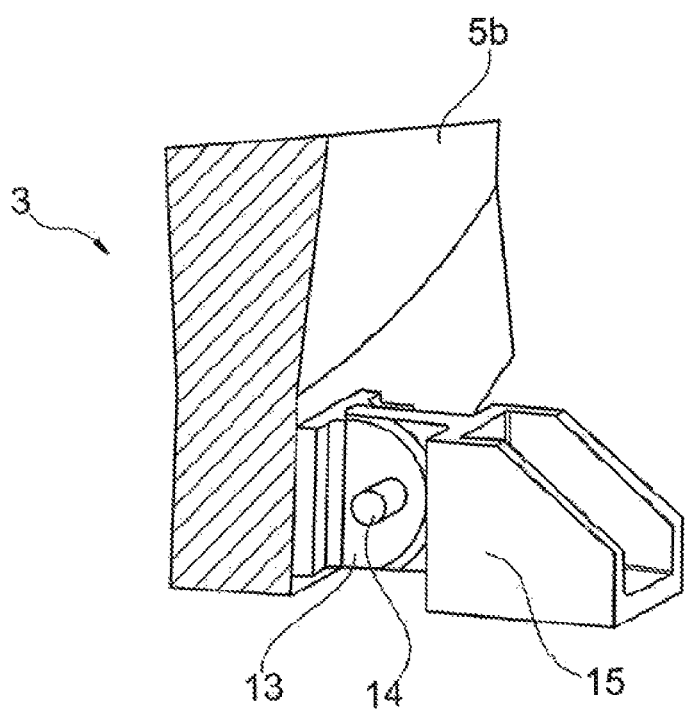

According to FIG. 4, in a third embodiment the pivoting bearing means comprise a first bearing block 13, attached in the edge region of the exterior shell 5b of the pressure bulkhead 3 and radially projecting from the aforesaid, which first bearing block 13 by way of a bearing pin 14 interacts with a correspondingly formed second bearing block 15. While the first bearing block 13 is riveted to the pressure bulkhead 3, the second bearing block 15 is attached to the fuselage structure.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. An aircraft comprising:
    a pressure bulkhead; and
    a fuselage shell,
        wherein the pressure bulkhead is disposed in the fuselage shell for forming a fuselage-internal pressure region,
        wherein the pressure bulkhead is attached on the edge in the interior of the fuselage shell, and
        wherein the pressure bulkhead has a lenticular cross-section and a sandwich construction comprising a foam core sandwiched between first and second opposing outwardly-curved exterior shells.

2. The pressure bulkhead of claim 1, wherein each exterior shell comprises a curved cross section formed in accordance with a parabolic function.

3. The pressure bulkhead of claim 1, wherein the exterior shells of the pressure bulkhead comprise a fiber-reinforced plastic material.

4. The pressure bulkhead of claim 1, wherein the foam core of the pressure bulkhead comprises a polymethacrylimide material.

5. The pressure bulkhead of claim 1, wherein the pressure bulkhead is attached, by way of pivoting bearing means, in the interior to the fuselage shell.

6. The pressure bulkhead of claim 5, wherein the pivoting bearing means are configured as at least one pair of opposing hinge elements which are attached to the edge of the respectively associated exterior shell of the pressure bulkhead and to the fuselage structure.

7. The pressure bulkhead of claim 6, wherein the hinge element is attached by way of multi-row riveting to the pressure bulkhead and to the fuselage structure.

8. The pressure bulkhead of claim 5, wherein the pivoting bearing means comprise a bearing-pin ring extending in the radial direction away from the edge of the pressure bulkhead, the bearing-pin ring interacting in a positive-locking manner with a bearing-seat ring attached to the fuselage structure.

9. The pressure bulkhead of claim 8, wherein the bearing-seat ring comprises first and second ring halves that partially enclose the bearing-pin ring.

10. The pressure bulkhead of claim 5, wherein the pivoting bearing means comprise at least one first bearing block, which in the edge region of one exterior shell of the pressure bulkhead is attached so as to radially project from said exterior shell, which first bearing block interacts, by way of a bearing pin, with a second bearing block, designed so as to correspond to the aforesaid, which second bearing block is attached to the fuselage structure.

* * * * *